United States Patent
Kobayashi et al.

(10) Patent No.: US 6,313,589 B1
(45) Date of Patent: Nov. 6, 2001

(54) POWER SUPPLY CIRCUIT FOR TRAFFIC SIGNAL LIGHTS UTILIZING LEDS

(75) Inventors: Yasumasa Kobayashi, Saitama; Noriko Akimoto, Tokyo, both of (JP)

(73) Assignee: Tokiwa Dengyo Co., Ltd., Tokyo (JP)

( * ) Notice: Subject to any disclaimer, the term of this patent is extended or adjusted under 35 U.S.C. 154(b) by 0 days.

(21) Appl. No.: 09/676,986

(22) Filed: Oct. 2, 2000

(30) Foreign Application Priority Data

Nov. 16, 1999 (JP) .................................................. 11-326104

(51) Int. Cl.⁷ ...................................................... G05F 1/00
(52) U.S. Cl. .......................... 315/309; 315/307; 315/246; 362/800; 340/907
(58) Field of Search .................................... 315/129, 135, 315/246, 306, 307, 309; 323/907, 901; 363/49; 340/641, 642, 660, 663, 931, 907; 362/800

(56) References Cited

U.S. PATENT DOCUMENTS 5,663,719 * 9/1997 Desse et al. .......................... 340/912
6,150,771 * 11/2000 Perry ..................................... 315/291

* cited by examiner

Primary Examiner—Shawn Riley
(74) Attorney, Agent, or Firm—Oblon, Spivak, McClelland, Maier & Neustadt, P.C.

(57) ABSTRACT

A power supply circuit comprises a rectification section for rectifying AC voltage so as to obtain DC voltage, a voltage regulating circuit section for receiving the DC voltage and outputting a constant voltage, a light-emitting diode driven by the voltage output from the voltage regulating circuit section, and an output voltage detection section for detecting ambient temperature and the voltage output from the voltage regulating circuit section and outputting a voltage suitable for the light-emitting diode to operate at the detected ambient temperature. The voltage regulating circuit section compares the voltage output from the output voltage detection section with a reference voltage so as to obtain a control signal, inputs to a transformer current which is switched in accordance with the control signal, and supplies an output from the transformer to the light-emitting diode.

4 Claims, 13 Drawing Sheets

Results of Measurement of Variation In Illuminance
of Red Led Light With Temperature

| Temp(°C) | Illuminance Variation Rate(%) | Output Voltage(V) | Output Current(mA) | Note |
|---|---|---|---|---|
| 23 | 100.0 | 73.17 | 99 | Normal Temperature |
| -40 | 152.2 | 78.29 | 100 | 0 Min. Power On |
| -40 | 144.9 | 77.82 | 100 | 5 Min. After Power On |
| -40 | 144.5 | 77.8 | 99 | 10 Min. After Power On |
| -40 | 144.5 | 77.81 | 99 | 15 Min. After Power On |
| -20 | 128.6 | 76.3 | 96 | 0 Min. Power On |
| -20 | 126.1 | 75.98 | 99 | 5 Min. After Power On |
| -20 | 126.1 | 75.95 | 99 | 10 Min. After Power On |
| -20 | 126.1 | 75.94 | 99 | 15 Min. After Power On |
| 0 | 113.9 | 74.83 | 98 | 0 Min. Power On |
| 0 | 109.8 | 74.41 | 99 | 5 Min. After Power On |
| 0 | 109.0 | 74.36 | 99 | 10 Min. After Power On |
| 0 | 109.0 | 74.35 | 99 | 15 Min. After Power On |
| 40 | 83.7 | 72.13 | 99 | 0 Min. Power On |
| 40 | 79.6 | 71.76 | 100 | 5 Min. After Power On |
| 40 | 79.2 | 71.71 | 100 | 10 Min. After Power On |
| 40 | 79.2 | 71.69 | 100 | 15 Min. After Power On |
| 60 | 70.2 | 70.99 | 100 | 0 Min. Power On |
| 60 | 66.5 | 70.56 | 100 | 5 Min. After Power On |
| 60 | 66.1 | 70.52 | 101 | 10 Min. After Power On |
| 60 | 65.7 | 70.5 | 101 | 15 Min. After Power On |
| 80 | 58.4 | 69.81 | 101 | 0 Min. Power On |
| 80 | 54.3 | 69.44 | 102 | 5 Min. After Power On |
| 80 | 53.9 | 69.39 | 102 | 10 Min. After Power On |
| 80 | 53.9 | 69.38 | 102 | 15 Min. After Power On |

Note)
Measurement Date:Oct.27,1999
  Weather: Rainy
  Temperature: 23°C
  Humidity: 67%
Model No.: JR-001
(Not Provided With Temperature Compensation Circuit of Present Invention)

Illuminance Variation Rate:
  53.9% ~ 152.2%

FIG.11

Results of Measurement of Variation In Illuminance of Red Led Light With Temperature

| Temp(°C) | Illuminance Variation Rate(%) | Output Voltage(V) | Output Current(mA) | Note |
|---|---|---|---|---|
| 25 | 100.0 | 73.54 | 110 | Normal Temperature |
| -40 | 82.7 | 75.33 | 54 | 0 Min. Power On |
| -40 | 83.4 | 75.27 | 55 | 5 Min. After Power On |
| -40 | 80.7 | 75.28 | 55 | 10 Min. After Power On |
| -40 | 80.0 | 75.28 | 55 | 15 Min. After Power On |
| -20 | 92.0 | 74.93 | 68 | 0 Min. Power On |
| -20 | 94.0 | 74.89 | 71 | 5 Min. After Power On |
| -20 | 94.0 | 74.89 | 72 | 10 Min. After Power On |
| -20 | 94.0 | 74.89 | 72 | 15 Min. After Power On |
| 0 | 100.0 | 74.54 | 83 | 0 Min. Power On |
| 0 | 102.0 | 74.47 | 87 | 5 Min. After Power On |
| 0 | 102.0 | 74.47 | 87 | 10 Min. After Power On |
| 0 | 102.0 | 74.47 | 87 | 15 Min. After Power On |
| 40 | 98.7 | 73.76 | 105 | 0 Min. Power On |
| 40 | 96.0 | 73.59 | 112 | 5 Min. After Power On |
| 40 | 95.3 | 73.56 | 114 | 10 Min. After Power On |
| 40 | 94.7 | 73.55 | 114 | 15 Min. After Power On |
| 60 | 87.4 | 73.17 | 120 | 0 Min. Power On |
| 60 | 83.4 | 73.07 | 125 | 5 Min. After Power On |
| 60 | 82.0 | 73.06 | 126 | 10 Min. After Power On |
| 60 | 82.0 | 73.05 | 126 | 15 Min. After Power On |
| 80 | 74.7 | 72.69 | 130 | 0 Min. Power On |
| 80 | 69.4 | 72.61 | 135 | 5 Min. After Power On |
| 80 | 68.1 | 72.58 | 136 | 10 Min. After Power On |
| 80 | 67.4 | 72.56 | 136 | 15 Min. After Power On |

Note)
Measurement Date:Oct.23,1999
Weather: Fine
Temperature: 24.5°C
Humidity: 40%
Model No.: JR-010
(Provided With Temperature Compensation Circuit of Present Invention)

Illuminance Variation Rate:
67.4% ~ 102%

Total Output Current Did Not Exceed Absolute Upper Limit Even When Led Was Driven at 80°C

FIG.12

Results of Measurement of Variation In Illuminance of Yellow Led Light With Temperature

| Temp(°C) | Illuminance Variation Rate(%) | Output Voltage(V) | Output Current(mA) | Note |
|---|---|---|---|---|
| 23 | 100.0 | 78.29 | 103 | Normal Temperature |
| -40 | 240.0 | 83.59 | 105 | 0 Min. Power On |
| -40 | 207.9 | 83.06 | 103 | 5 Min. After Power On |
| -40 | 206.3 | 83.06 | 103 | 10 Min. After Power On |
| -40 | 206.3 | 83.07 | 103 | 15 Min. After Power On |
| -20 | 177.5 | 81.59 | 103 | 0 Min. Power On |
| -20 | 157.5 | 81.34 | 103 | 5 Min. After Power On |
| -20 | 156.7 | 81.31 | 103 | 10 Min. After Power On |
| -20 | 156.3 | 81.3 | 103 | 15 Min. After Power On |
| 0 | 139.2 | 80.26 | 103 | 0 Min. Power On |
| 0 | 116.7 | 79.76 | 103 | 5 Min. After Power On |
| 0 | 115.0 | 79.7 | 103 | 10 Min. After Power On |
| 0 | 114.6 | 79.69 | 103 | 15 Min. After Power On |
| 40 | 72.5 | 77.38 | 103 | 0 Min. Power On |
| 40 | 58.8 | 76.88 | 103 | 5 Min. After Power On |
| 40 | 57.9 | 76.82 | 103 | 10 Min. After Power On |
| 40 | 57.5 | 76.8 | 103 | 15 Min. After Power On |
| 60 | 49.6 | 75.95 | 103 | 0 Min. Power On |
| 60 | 41.3 | 75.49 | 103 | 5 Min. After Power On |
| 60 | 40.4 | 75.41 | 103 | 10 Min. After Power On |
| 60 | 40.0 | 75.39 | 103 | 15 Min. After Power On |
| 80 | 35.3 | 74.66 | 104 | 0 Min. Power On |
| 80 | 29.0 | 74.1 | 104 | 5 Min. After Power On |
| 80 | 28.6 | 74.04 | 104 | 10 Min. After Power On |
| 80 | 28.4 | 74.01 | 104 | 15 Min. After Power On |

Note)
Measurement Date: Oct. 28, 1999
Weather: Fine
Temperature: 23°C
Humidity: 48%
Model No.: JY-001
(Not Provided With Temperature Compensation Circuit of Present Invention)

Illuminance Variation Rate:
28.4% ~ 240%

FIG.13

Results of Measurement of Variation In Illuminance
of Yellow Led Light With Temperature

| Temp(°C) | Illuminance Variation Rate(%) | Output Voltage(V) | Output Current(mA) | Note |
|---|---|---|---|---|
| 23.5 | 100.0 | 77.92 | 95 | Normal Temperature |
| -40 | 138.5 | 79.14 | 55 | 0 Min. Power On |
| -40 | 134.5 | 79.1 | 56 | 5 Min. After Power On |
| -40 | 134.5 | 79.1 | 56 | 10 Min. After Power On |
| -40 | 133.9 | 79.1 | 56 | 15 Min. After Power On |
| -20 | 136.2 | 78.88 | 68 | 0 Min. Power On |
| -20 | 131.0 | 78.78 | 70 | 5 Min. After Power On |
| -20 | 130.5 | 78.78 | 71 | 10 Min. After Power On |
| -20 | 130.5 | 78.78 | 71 | 15 Min. After Power On |
| 0 | 123.6 | 78.52 | 81 | 0 Min. Power On |
| 0 | 115.5 | 78.4 | 84 | 5 Min. After Power On |
| 0 | 115.5 | 78.4 | 84 | 10 Min. After Power On |
| 0 | 115.5 | 78.4 | 84 | 15 Min. After Power On |
| 40 | 80.5 | 77.65 | 103 | 0 Min. Power On |
| 40 | 83.3 | 77.51 | 108 | 5 Min. After Power On |
| 40 | 81.0 | 77.48 | 108 | 10 Min. After Power On |
| 40 | 81.0 | 77.48 | 108 | 15 Min. After Power On |
| 60 | 64.4 | 77.21 | 113 | 0 Min. Power On |
| 60 | 55.7 | 77.03 | 121 | 5 Min. After Power On |
| 60 | 55.7 | 77.02 | 121 | 10 Min. After Power On |
| 60 | 55.7 | 77.02 | 121 | 15 Min. After Power On |
| 80 | 47.9 | 76.74 | 126 | 0 Min. Power On |
| 80 | 41.6 | 76.53 | 132 | 5 Min. After Power On |
| 80 | 40.1 | 76.24 | 129 | 10 Min. After Power On |
| 80 | 39.4 | 76.06 | 127 | 15 Min. After Power On |

Note)
Measurement Date:Oct.26,1999
  Weather: Fine
  Temperature: 23.5°C
  Humidity: 52%

Model No.: JY-010
(Provided With Temperature Compensation Circuit of Present Invention)

Illuminance Variation Rate:
  39.4% ~ 138.5%

Total Output Current Did Not Exceed Absolute Upper Limit Even When Led Was Driven at 80°C

FIG.14

Results of Measurement of Variation In Illuminance of Green Led Light With Temperature

| Temp(°C) | Illuminance Variation Rate(%) | Output Voltage(V) | Output Current(mA) | Note |
|---|---|---|---|---|
| 23.5 | 100.0 | 93 | 100 | Normal Temperature |
| -40 | 111.9 | 99.48 | 102 | 0 Min. Power On |
| -40 | 108.3 | 96.95 | 98 | 5 Min. After Power On |
| -40 | 108.3 | 96.91 | 98 | 10 Min. After Power On |
| -40 | 108.3 | 96.92 | 97 | 15 Min. After Power On |
| -20 | 105.5 | 95.51 | 96 | 0 Min. Power On |
| -20 | 106.4 | 95.2 | 99 | 5 Min. After Power On |
| -20 | 106.4 | 95.2 | 100 | 10 Min. After Power On |
| -20 | 106.4 | 95.24 | 100 | 15 Min. After Power On |
| 0 | 104.6 | 94.26 | 100 | 0 Min. Power On |
| 0 | 103.7 | 93.67 | 100 | 5 Min. After Power On |
| 0 | 103.7 | 93.71 | 100 | 10 Min. After Power On |
| 0 | 103.7 | 93.72 | 100 | 15 Min. After Power On |
| 40 | 99.1 | 91.46 | 100 | 0 Min. Power On |
| 40 | 98.2 | 91.01 | 100 | 5 Min. After Power On |
| 40 | 97.2 | 90.96 | 101 | 10 Min. After Power On |
| 40 | 97.2 | 90.95 | 100 | 15 Min. After Power On |
| 60 | 96.3 | 90.21 | *101 | 0 Min. Power On |
| 60 | 95.4 | 89.56 | *101 | 5 Min. After Power On |
| 60 | 95.4 | 89.55 | *101 | 10 Min. After Power On |
| 60 | 95.4 | 89.55 | *101 | 15 Min. After Power On |
| 80 | | | | 0 Min. Power On |
| 80 | | | | 5 Min. After Power On |
| 80 | | | | 10 Min. After Power On |
| 80 | | | | 15 Min. After Power On |

Note)
Measurement Date:Oct.28,1999
Weather: Fine
Temperature: 23°C
Humidity: 48%

Model No.: JG-001
(Not Provided With Temperature Compensation Circuit of Present Invention)

Illuminance Variation Rate:
95.4% ~ 111.9%

* Represents Measurement During Which Current Exceeded Absolute Upper Limit (Current at Which Led Cannot be Used)

FIG.15

Results of Measurement of Variation In Illuminance of Yellow Led Light With Temperature

| Temp(°C) | Illuminance Variation Rate(%) | Output Voltage(V) | Output Current(mA) | Note |
|---|---|---|---|---|
| 24 | 100.0 | 87.26 | 53 | Normal Temperature |
| -40 | 82.4 | 90.15 | 34.5 | 0 Min. Power On |
| -40 | 81.1 | 90.02 | 34.6 | 5 Min. After Power On |
| -40 | 81.7 | 90.01 | 35 | 10 Min. After Power On |
| -40 | 82.2 | 89.42 | 35.5 | 15 Min. After Power On |
| -20 | 92.6 | 89.23 | 42.5 | 0 Min. Power On |
| -20 | 91.1 | 89.24 | 43 | 5 Min. After Power On |
| -20 | 91.2 | 89.23 | 43 | 10 Min. After Power On |
| -20 | 91.2 | 88.83 | 43 | 15 Min. After Power On |
| 0 | 99.1 | 88.46 | 49.5 | 0 Min. Power On |
| 0 | 100.3 | 88.43 | 49.5 | 5 Min. After Power On |
| 0 | 100.1 | 88.42 | 49.5 | 10 Min. After Power On |
| 0 | 99.6 | 87.79 | 48.5 | 15 Min. After Power On |
| 20 | 104.5 | 87.43 | 54 | 0 Min. Power On |
| 20 | 100.8 | 87.36 | 52.2 | 5 Min. After Power On |
| 20 | 99.9 | 87.36 | 52 | 10 Min. After Power On |
| 20 | 99.6 | 85.13 | 51.7 | 15 Min. After Power On |
| 40 | 88.2 | 83.84 | 42 | 0 Min. Power On |
| 40 | 74.0 | 83.63 | 36 | 5 Min. After Power On |
| 40 | 71.9 | 83.58 | 34.5 | 10 Min. After Power On |
| 40 | 71.3 | 81.04 | 34 | 15 Min. After Power On |
| 60 | 58.1 | 80.42 | 26.1 | 0 Min. Power On |
| 60 | 52.3 | 76.53 | 26.2 | 5 Min. After Power On |
| 60 | 52.0 | 80.38 | 26.2 | 10 Min. After Power On |
| 60 | 51.9 | 80.37 | 26.2 | 15 Min. After Power On |
| 80 | 51.0 | 79.02 | 25 | 0 Min. Power On |
| 80 | 47.1 | 78.67 | 23 | 5 Min. After Power On |
| 80 | 47.1 | 78.66 | 23 | 10 Min. After Power On |
| 80 | 47.1 | 78.65 | 23 | 15 Min. After Power On |

Note)
Measurement Date:Oct.29,1999
Weather: Fine
Temperature: 24°C
Humidity: 56%

Model No.: JR-010
(Provided With Temperature Compensation Circuit of Present Invention)

Illuminance Variation Rate:
47.1% ~ 104.5%

Total Output Current Did Not Exceed Absolute Upper Limit Even When Led Was Driven at 80°C

POWER SUPPLY CIRCUIT FOR TRAFFIC SIGNAL LIGHTS UTILIZING LEDS

BACKGROUND OF THE INVENTION

1. Field of the Invention

The present invention relates to a power supply circuit for use with, for example, signal lights utilizing LEDs (light-emitting diodes).

2. Description of the Related Art

An attempt has been made to use signal lights utilizing LEDs as traffic lights. LEDs can provide various colors and can be used as excellent light sources for lighting equipment, because LEDs have higher luminous efficiencies than do incandescent lamps and are excellent in terms of energy conservation.

In order to use an LED light source as a light source of a traffic light or ordinary lighting equipment indoor and outdoor, while guaranteeing safety and long service life, the LED light source must be used in consideration of great changes in environmental temperature from winter to summer.

For example, when a signal light utilizing an LED is used at temperatures lower than 0° C. in winter, heat is rapidly generated at a light-emitting portion of the LED when the LED is turned on, with the result that an internal material constituting the LED expands thermally. Since the entire structure of the LED is in a contracted state at such low temperature, the internal expansion generated when the LED is turned on generates mechanical stress within the LED structure.

Accordingly, repeated turning on and off operations create severe operating conditions, possibly resulting in breakage of the LED, depending on the conditions.

Therefore, in order to secure a required quantity of light and mitigate the above-described phenomena, current supplied to the LED must be determined in consideration of the temperature characteristics of the LED such that the current becomes suitable for temperatures encountered during winter.

Further, when an LED is used at high temperature in summer, the following points must be taken into consideration. A manufacturer of LEDs provides various ratings in relation to use of LEDs. According to such ratings, when an LED is used in an environment having a temperature higher than room temperature, the maximum current permitted to be supplied to the LED is lower than that at room temperature.

That is, when during actual use an LED is placed in a high-temperature atmosphere having a temperature higher than about 40° C., the current supplied to the LED must be reduced as compared with that supplied at ordinary temperature, in order to prevent thermal damage such as thermal fusion of an internal material that constitutes the LED.

Therefore, for such high temperature use, the supply current must be determined so as to secure a required quantity of light and not to exceed a rated current specified for high temperatures encountered during summer.

Further, conventional signal lights utilizing an LED have a drawback in that there arises a time delay between supply of power and actual emission of light from the LED.

SUMMARY OF THE INVENTION

In view of the foregoing demands and problems, an object of the present invention is to provide a power supply circuit which is used with signal lights or other lights utilizing an LED and which enables the LED to properly operate in the cold during winter and in the hot during summer and to emit light immediately after being turned on.

To achieve the above object, the present invention provides a power supply circuit comprising: a rectification section for rectifying AC voltage so as to obtain DC voltage; a voltage regulating circuit section for receiving the DC voltage and outputting a constant voltage; a light-emitting diode driven by the voltage output from the voltage regulating circuit section; and an output voltage detection section for detecting ambient temperature and the voltage output from the voltage regulating circuit section and outputting a voltage suitable for the light-emitting diode to operate at the detected ambient temperature, wherein the voltage regulating circuit section compares the voltage output from the output voltage detection section with a reference voltage so as to obtain a control signal; inputs to a transformer current which is switched in accordance with the control signal; and supplies an output from the transformer to the light-emitting diode.

The power supply circuit according to the present invention enables an LED to properly operate in the cold during winter and in the hot during summer and to emit light immediately after being turned on.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments.

FIGS. 10–15 are graphs each showing variation in illuminance with temperature.

DESCRIPTION OF THE PREFERRED EMBODIMENTS

An embodiment of the present invention will be described with reference to the drawings.

Figure 1:
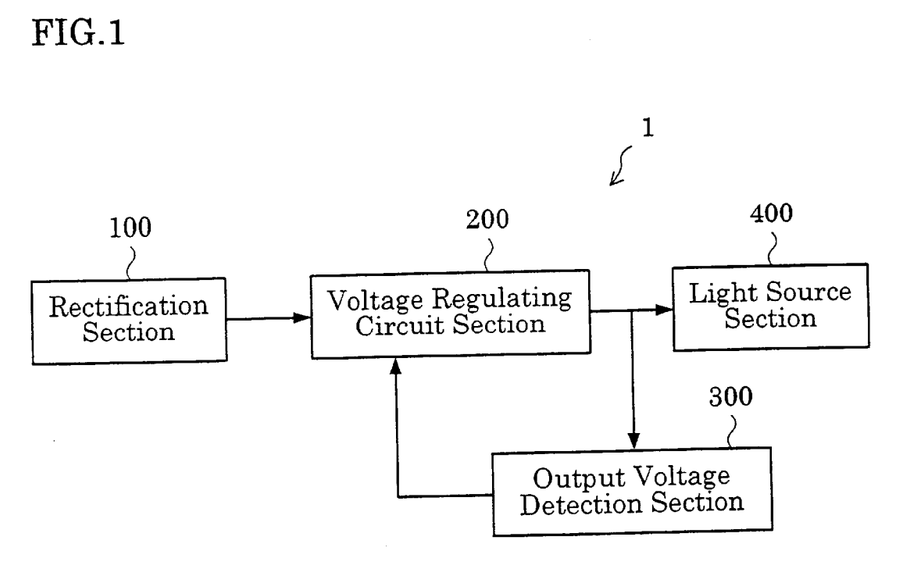
FIG. 1 is a block diagram showing the configuration of a power supply circuit according to an embodiment of the present invention.

FIG. 1 is a block diagram showing the configuration of a power supply circuit 1 according to an embodiment of the present invention. The power supply circuit 1 comprises a rectification section 100, a voltage regulating circuit section 200, an output voltage detection section 300, and a light source section 400.

The rectification section 100 rectifies AC voltage so as to obtain DC voltage. The voltage regulating circuit section 200 compares a reference voltage and an output voltage of the output voltage detection section 300 so as to obtain a control signal, and inputs to a transformer current which is switched in accordance with the control signal. An output from the transformer is fed to the light source section 400 and the output voltage detection section 300.

The output voltage detection section 300 comprises a temperature detection section for detecting ambient temperature. The output voltage detection section 300 detects the output voltage of the voltage regulating circuit section 200 and generates a signal that matches the temperature characteristic of light-emitting diodes of the light source section 400 in consideration of the ambient temperature. The thus-generated signal is fed back to the voltage regulating circuit section 200.

The light source section 400 includes a large number of LEDs and emits light upon receipt of voltage output from the voltage regulating circuit section 200.

Figure 2:
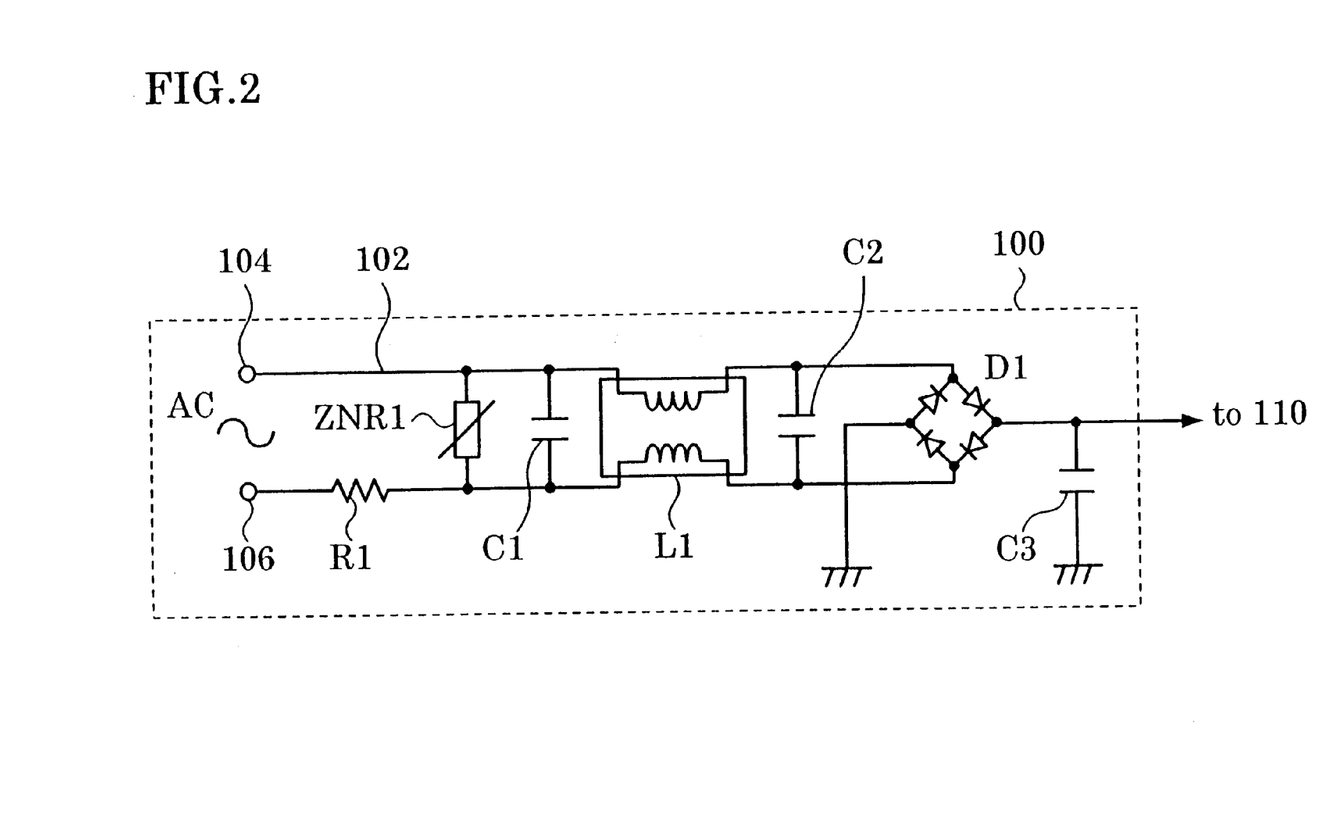
FIG. 2 is a circuit diagram showing the configuration of the rectification section.
Figure 3:
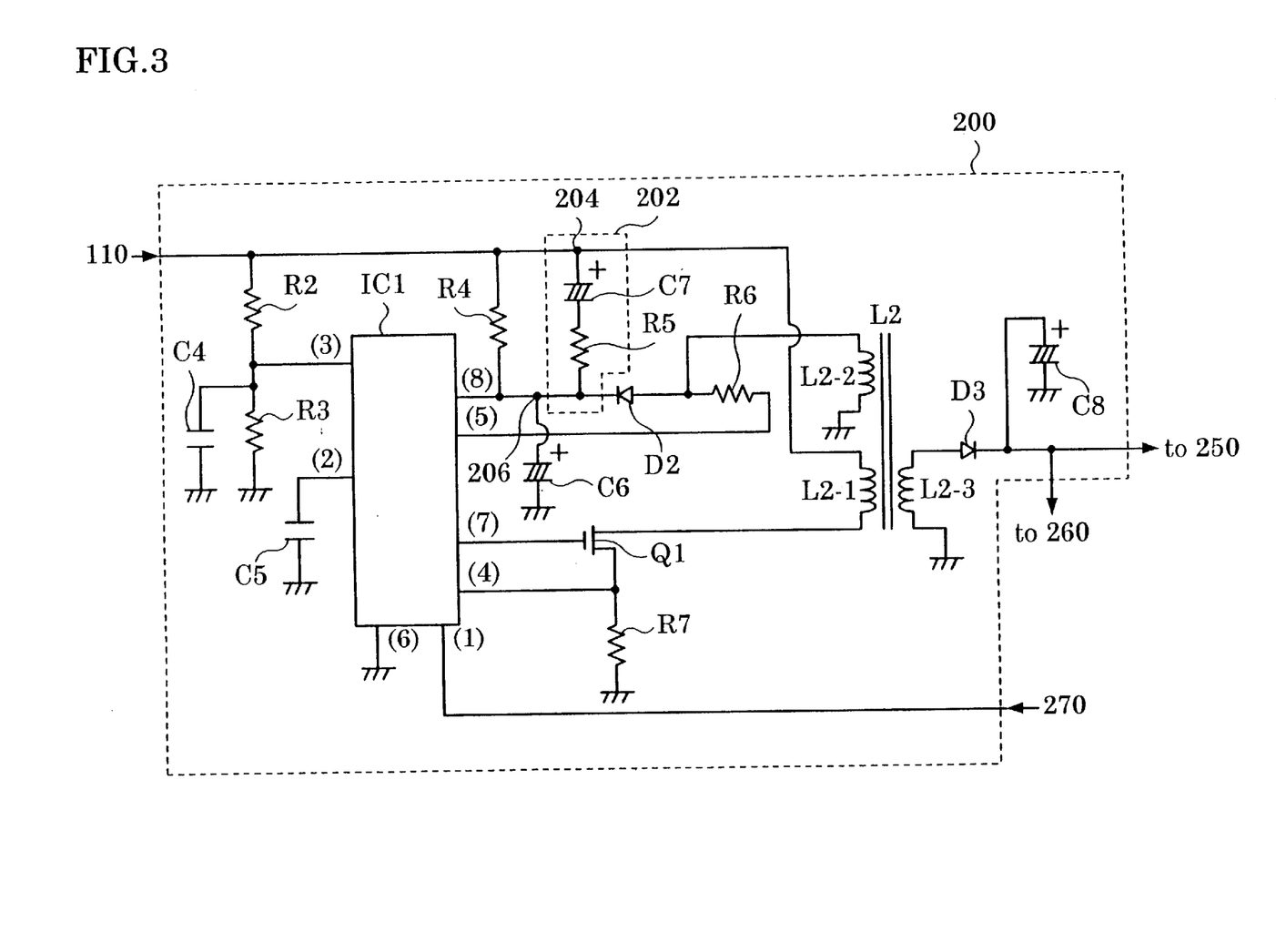
FIG. 3 is a circuit diagram showing the configuration of the voltage regulating circuit section.
Figure 4:
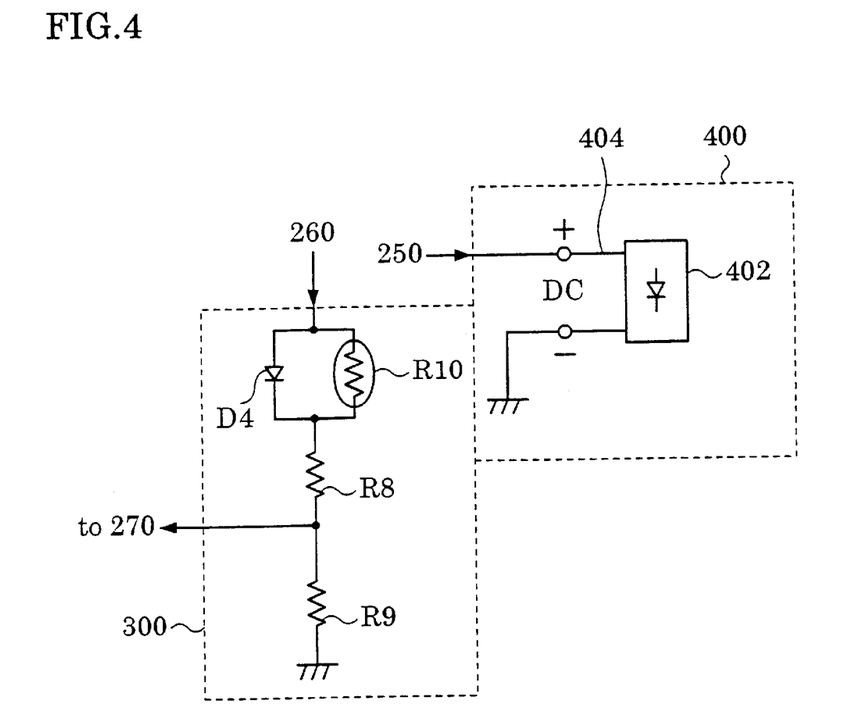
FIG. 4 is a circuit diagram showing the configuration of the output voltage detection section and the light source section.

FIGS. 2, 3, and 4 are circuit diagrams showing the detailed configurations of the rectification section 100, the voltage regulating circuit section 200, the output voltage detection section 300, and the light source section 400.

In the rectification section 100, AC voltage is applied between terminals 104 and 106. R1 denotes a resistor for circuit protection; ZNR1 denotes a surge absorber; and C1 denotes a capacitor for noise absorption. An AC line filter L1 is connected to the capacitor C1, and a capacitor C2 for noise absorption is connected to the AC line filter L1.

D1 denotes a bridge diode for rectifying the AC voltage to DC voltage; and C3 denotes a capacitor for absorbing high-frequency noise and ripple voltage after rectification.

Next, the voltage regulating circuit section 200 will be described with reference to FIG. 3.

The voltage regulating circuit section 200 comprises resistors R2, R3, R4, R5, R6, and R7; capacitors C4, C5, C6, C7, and C8; a transformer L2, diodes D2 and D3; an integrated circuit IC1; a MOS-FET (Q1), and other components. The capacitor C7 and the resistor R5 constitute the start assist circuit 202.

The resistors R2 and R3 form a power supply circuit for operating a built-in multiplier of the integrated circuit IC1. The capacitor C4 absorbs noise. The capacitor C5 performs phase compensation for the integrated circuit IC1.

The resistor R4 causes a voltage drop and supplies operation voltage to the integrated circuit IC1. The capacitor C6 serves as a smoothing capacitor for absorbing ripple voltage.

The resistor R5 limits to a proper value current which flows from a point 204 to a point 206 to thereby assist quick charging of the capacitor C6 after the AC power is turned on, and in a steady state provides a proper impedance between points 204 and 206.

By virtue of differential operation, the capacitor C7 quickly charges the capacitor C6 after the AC power is turned on, to thereby enable the integrated circuit IC1 to start its operation quicker.

The transformer L2 has a primary coil L2-1 and secondary coils L2-2 and L2-3.

During steady switching operation, the diode D2 rectifies AC voltage generated from the secondary coil L2-2 of the transformer L2 and supplies DC power voltage to the integrated circuit IC1. Further, the diode D2 prevents reverse flow of current from point 206.

The resistor R6 is a resistor for a zero-current detection circuit of the integrated circuit IC1. The MOS-FET (Q1) chops current flowing through the primary coil L2-1 of the transformer L2 to thereby effect switching control.

The resistor R7 detects current flowing through the primary coil L2-1 of the transformer L2.

The diode D3 rectifies AC voltage output from the secondary coil L2-3 of the transformer L2. The capacitor C8 serves as a smoothing capacitor.

Next, the output voltage detection section 300 and the light source section 400 will be described with reference to FIG. 4. The output voltage detection section 300 comprises a light-emitting diode D4, a thermister R10, and resistors R8 and R9. The thermister R10 and the light-emitting diode D4 constitute a temperature detection section for detecting ambient temperature.

The light-emitting diode D4 is of the same type as that of light source LEDs 402. The light-emitting diode D4 serves as a temperature detection LED used mainly to correct the low temperature characteristics of the light source LEDs 402.

The thermister R10 serves as a temperature detection resistor used mainly to correct the high-temperature characteristics of the light source LEDs 402. The light source section 400 comprises the light source LEDs 402. The light source LEDs 402 emit light upon receipt of the output voltage of the voltage regulating circuit section 200.

Next, the operation of the power supply circuit 1 will be described.

The rectification section 100 rectifies AC voltage to obtain un-regulated DC voltage containing ripples. This DC voltage is supplied to the entire circuit as power source voltage.

The voltage regulating circuit section 200 contains a reference voltage generating source for generating a reference voltage and compares the reference voltage with a detection voltage output from the output voltage detection section 300 so as to obtain an error signal. The error signal is amplified so as to obtain a control signal.

In accordance with the control signal, the MOS-FET (Q1) is turned on and off, so that current flows through the primary coil L2-1 of the transformer L2 in a chopped or switched manner. Thus, an AC voltage is generated from the secondary coil L2-3 of the transformer L2.

The AC voltage output from the secondary coil L2-3 is rectified by the diode D3 and smoothed by the capacitor C8, so that a DC output voltage is obtained.

The output voltage detection section 300 includes an ambient temperature detection section and provides control such that the performance required of the light source LEDs 402 within a wide range of temperature variation from winter to summer is secured, and temperature characteristics of each of the light source LEDs 402 emitting different colors are taken into account. The light source section 400 includes a large number of the light source LEDs 402, in order to secure a quantity of light required in the light source section 400 and a function suitable for the purpose of use.

Next, the output voltage detection section 300 and the start assist circuit 202, which are the features of the present invention, will be described in detail.

Figure 5:
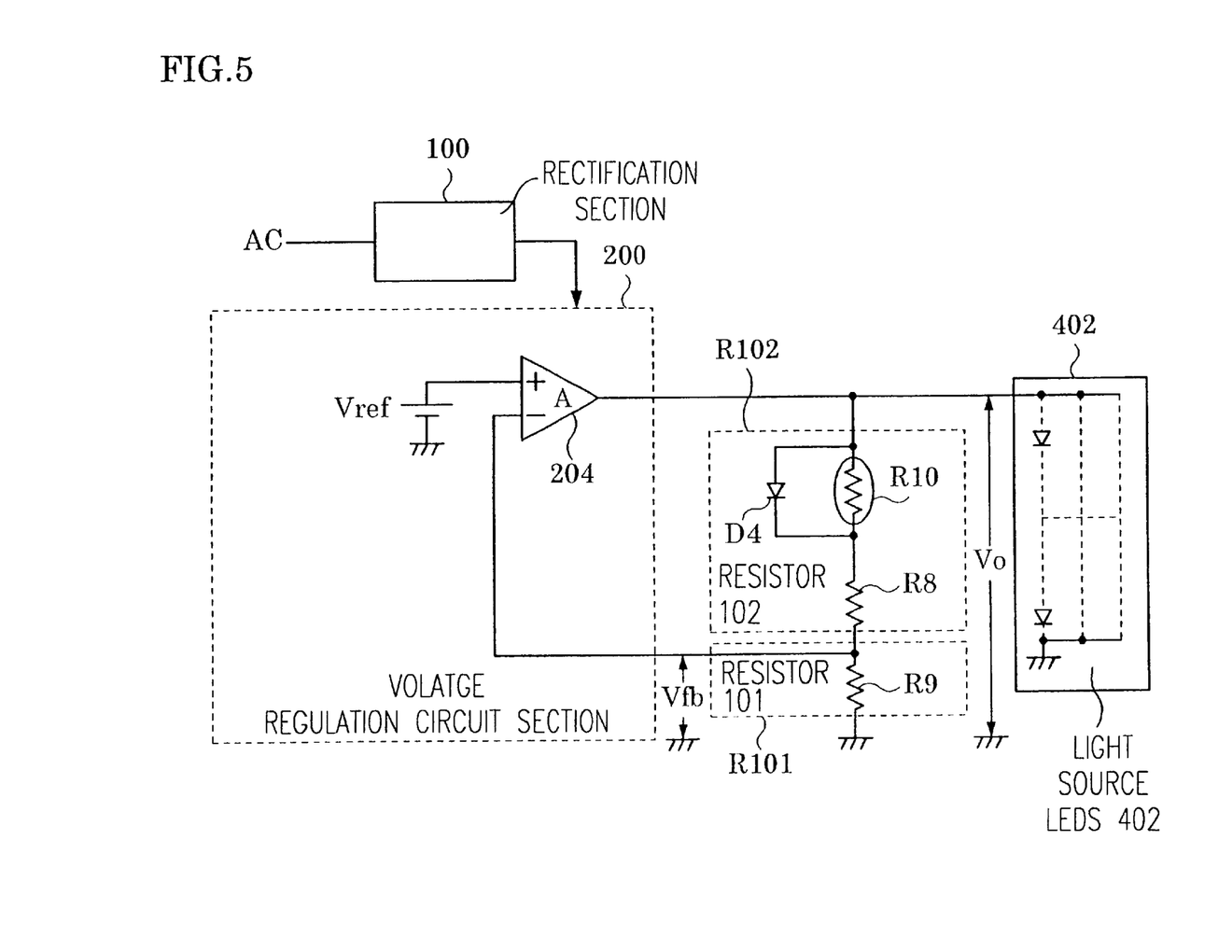
FIG. 5 is a schematic diagram showing the general configuration of the power supply circuit.

FIG. 5 is a schematic diagram of the power supply 1 in which the voltage regulating circuit section 200 is schematically shown. The voltage regulating circuit section 200 operates, while receiving the un-regulated DC voltage output from the rectification section 100.

An error amplifier 204 is provided in the integrated circuit IC1. A reference voltage Vref and the detection voltage Vfb of the output voltage detection section 300 are input to the error amplifier 204.

The error amplifier 204 compares the reference voltage Vref with the detection voltage Vfb—which indirectly represents an output voltage VO of the power supply circuit 1—so as to obtain an error, and outputs the error after amplification.

Through this control operation, the voltage Vfb approaches as close as possible to the reference voltage Vref, so that the output voltage VO of the power supply circuit 1 is maintained at a level determined by the reference voltage Vref.

The output voltage VO is expressed as follows:

$$VO = A(Vref - Vfb) \qquad (1)$$

where

A: gain;

Vref: reference voltage; and

Vfb: detection voltage obtained through voltage division of the output voltage VO and a correction suitable for the temperature characteristics of the LEDs.

The Vfb can be expressed as follows:

$$Vfb = R101 \cdot VO/(R101 + R102) \qquad (2)$$

where

R101 is the resistance of R9; and

R102 is the composite resistance of the light-emitting diode D4, the thermister R10, and the resistor R8.

Therefore, the following equations can be obtained through substitution of equation (2) into equation (1).

$$VO = A \cdot Vref - A \cdot R101 \cdot VO/(R101+R102)(1+A \cdot R101/(R101+R102))VO = A \cdot Vref$$

Accordingly, $$VO = A \cdot Vref/(1 + A \cdot R101/(R101 + R102)).$$

When A>1, VO can be approximated by the following equation:

$$VO = (R101 + R102) \cdot Vref/R101. \qquad (3)$$

Equation (3) indicates that VO is determined by (R101+R102)/R101, because Vref is constant. Accordingly, a stable output can be obtained irrespective of variation in AC power voltage.

In the present embodiment, in order to control the output voltage VO in consideration of the temperature characteristics of the light source LEDs 402, the resistance R102 is designed so as to vary properly for variation between high and low temperatures.

First, operation at temperatures below 0° C. encountered during winter will be described.

At low temperature, the resistance of the thermister R10 within the output voltage detection section 300 increases, with the result that current flows through only the light-emitting diode D4, and substantially no current flows through the thermister R10.

The light-emitting diode D4 produces a certain voltage drop corresponding to the threshold voltage thereof, which varies with ambient temperature. This temperature dependency is utilized in order to cancel out the temperature dependency of the light source LEDs 402 such that current which flows through the LEDs 402 decreases at low temperature due to an increase in the threshold voltage.

Through utilization of the temperature characteristics of the light-emitting diode D4 such that its threshold voltage increases with lowering temperature, the detection voltage decreases, and the output voltage is increased through the control operation, so that the current flowing through the light source LEDs 402 increases.

Meanwhile, the integrated circuit IC1 has temperature characteristics such that the internal reference voltage Vref increases with lowering temperature, which results in an increase in the output voltage and a resultant increase in the current flowing through the light source LEDs 402.

In the above-described manner, the temperature characteristics of the light source LEDs 402, the temperature characteristics of the light-emitting diode D4, and the temperature characteristics of the internal reference voltage Vref of the integrated circuit IC1 are combined such that the current flowing through the light source LEDs 402 gradually decreases as the ambient temperature decreases from ordinary temperature to lower temperature. Thus, the temperature dependency of quantity of emitted light is mitigated.

Next, operation at high temperature encountered during summer will be described.

When the ambient temperature increases, the resistance of the thermister R10 within the temperature detection section decreases, with the result that a larger current flows through the thermister R10. When the voltage drop across the thermister R10 becomes lower than the threshold voltage of the light-emitting diode D4, no current flows through the light-emitting diode D4.

Accordingly, when the voltage drop across the thermister R10 decreases with increasing temperature, the detection voltage Vfb increases, so that the temperature dependency of the internal reference voltage Vref of the integrated circuit IC1 is canceled out, and through control operation, the output voltage is lowered. Thus, the current flowing through the light source LEDs 402 at high temperature is maintained so as not exceed the maximum rated current.

Figure 10:
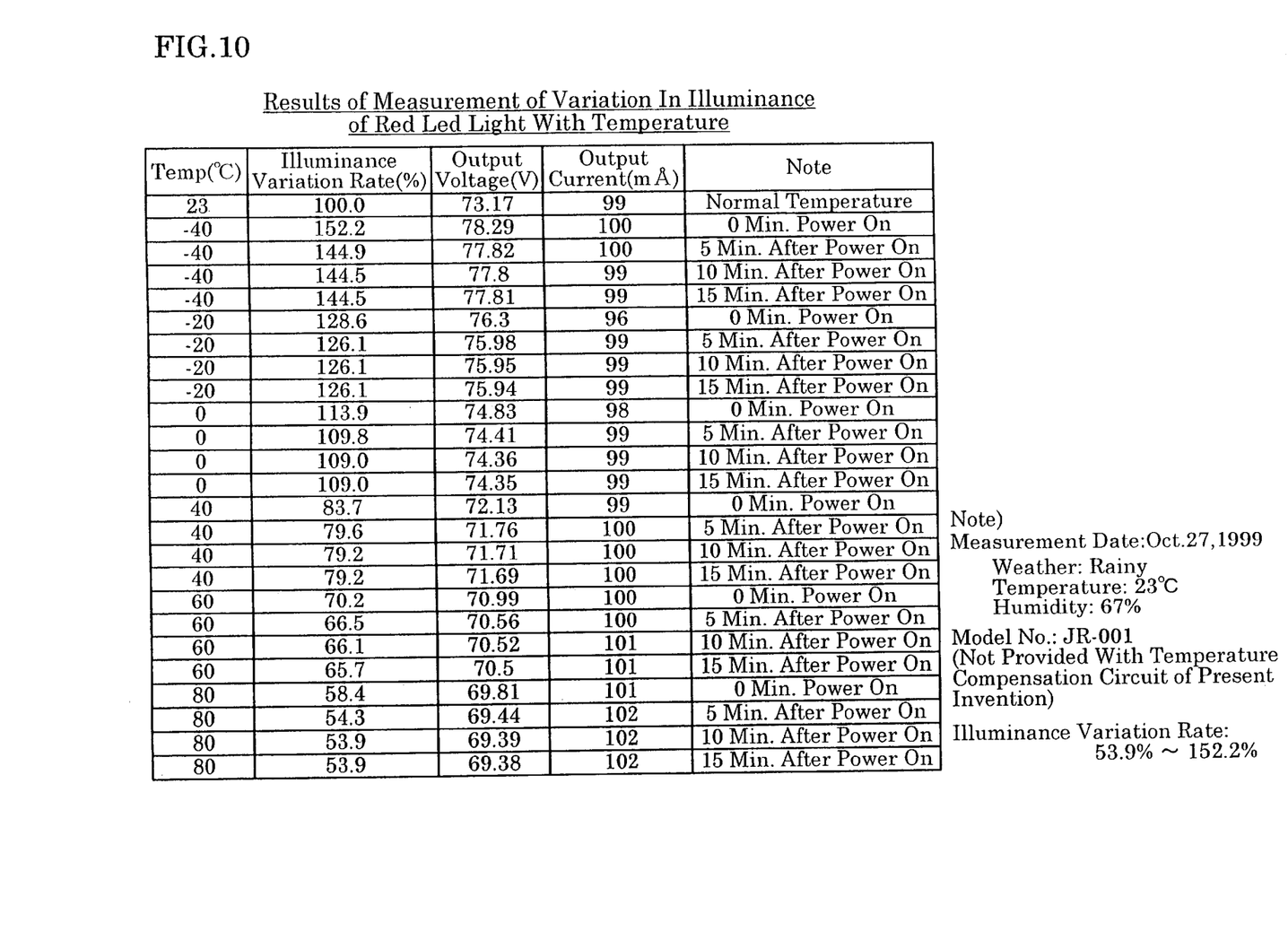
Figure 11:
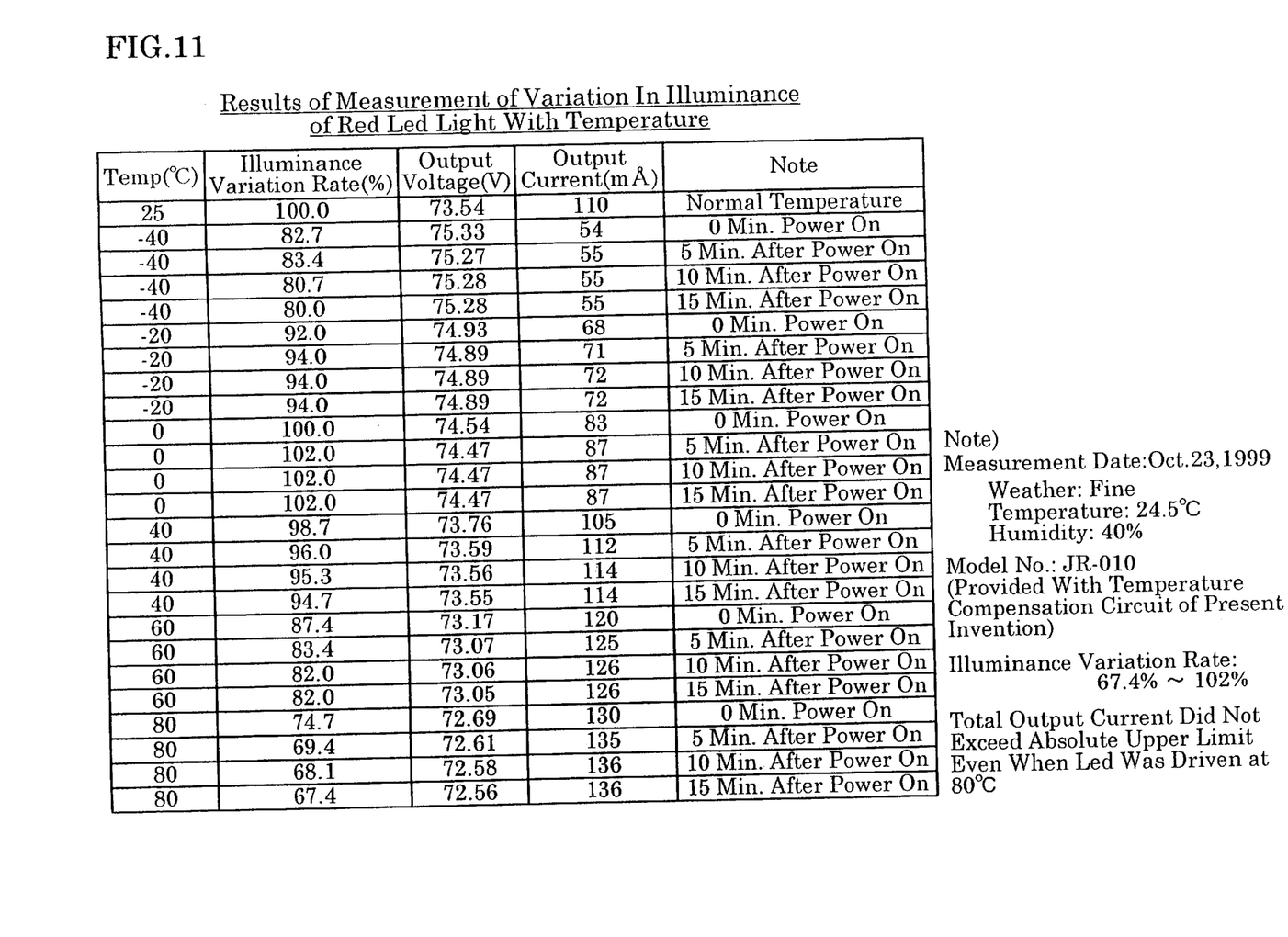
Figure 12:
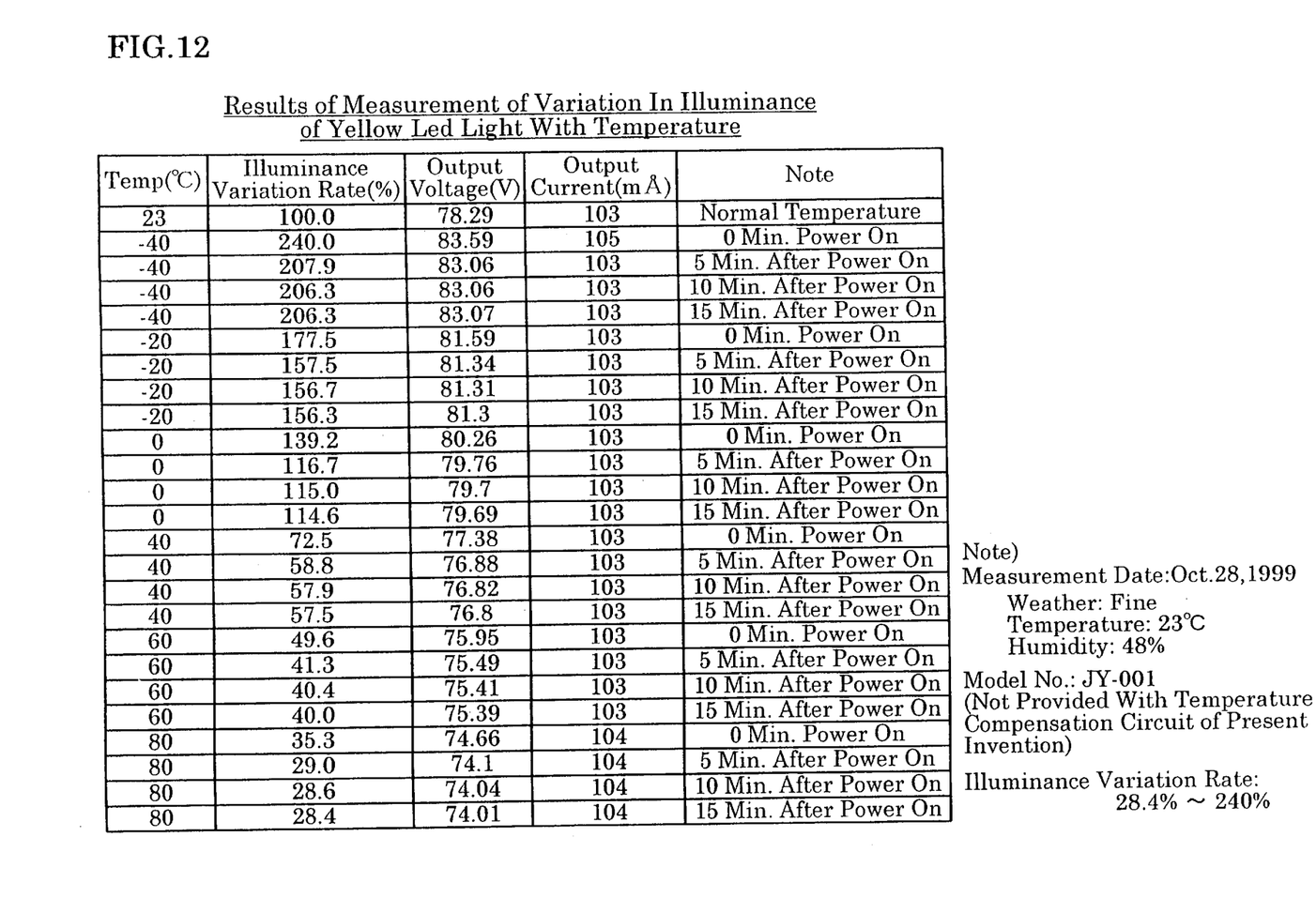
Figure 13:
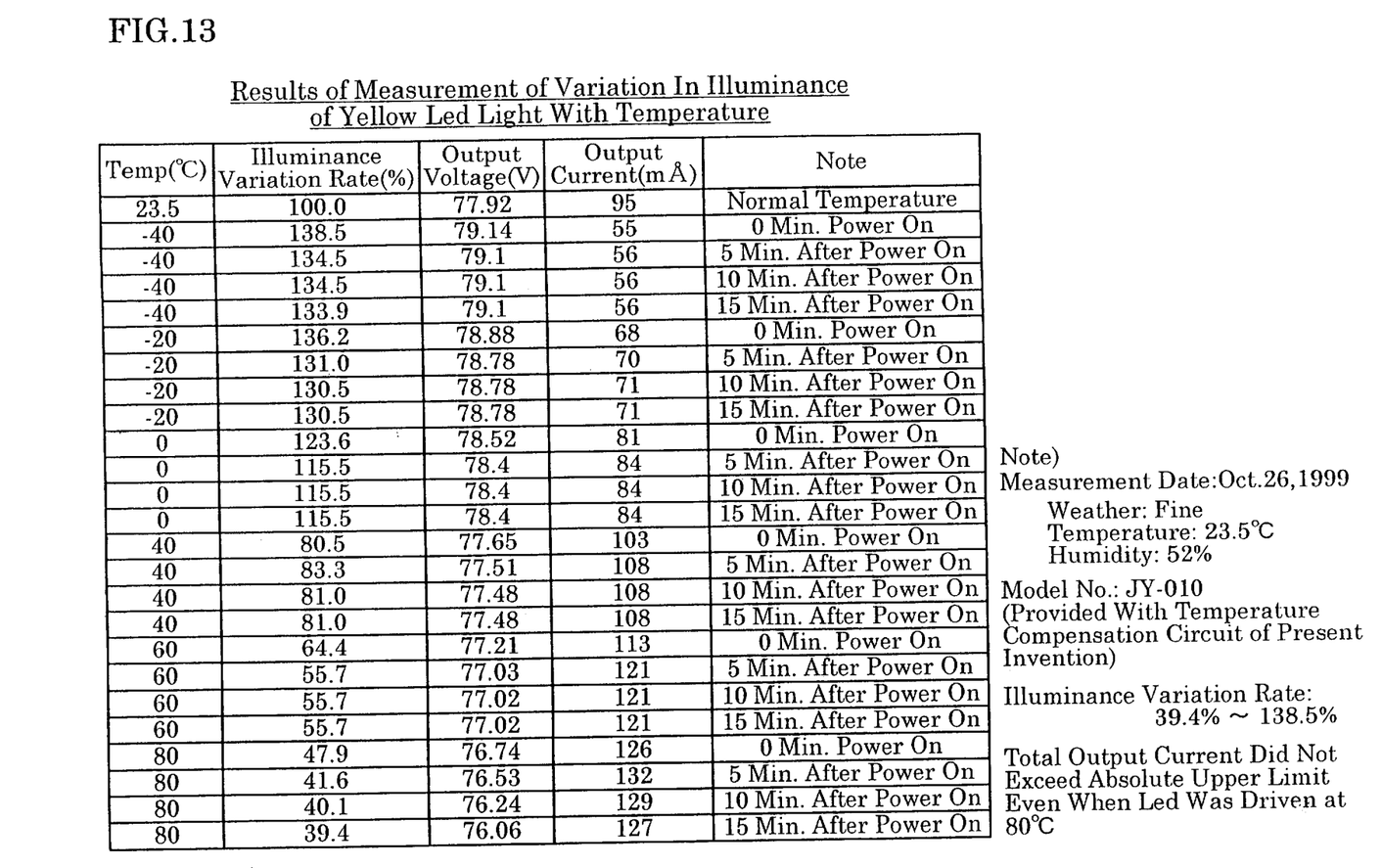
Figure 14:
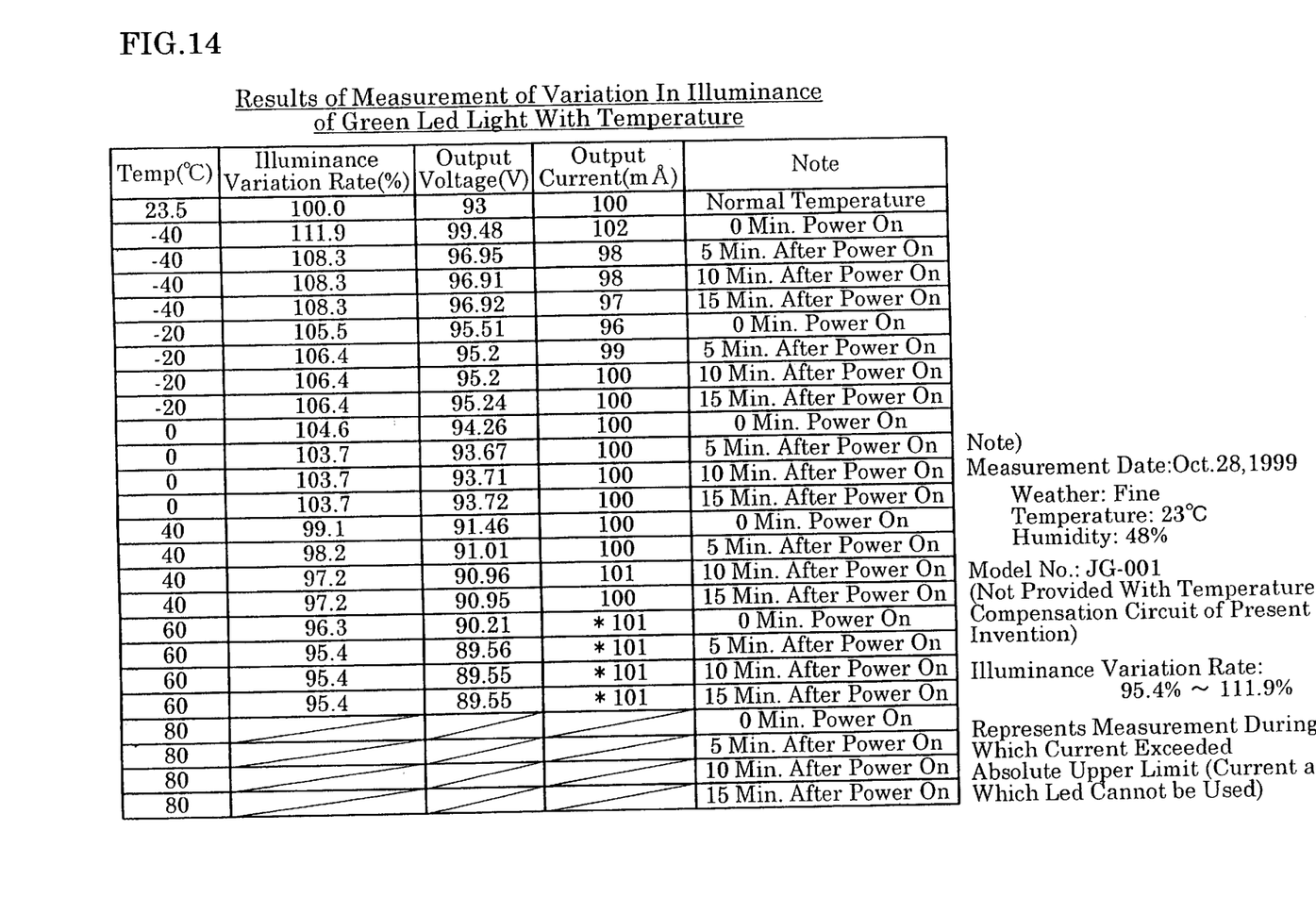

FIGS. 10 to 15 are graphs each showing results of an experiment in which variation in illuminance with temperature was measured. FIGS. 10 and 11 show results of an experiment performed for a red LED light; FIGS. 12 and 13 show results of an experiment performed for a yellow LED light; and FIGS. 14 and 15 show results of an experiment performed for a green LED light. FIGS. 10, 12, and 14 each show results of an experiment in which the temperature detection section composed of the light-emitting diode D4 and the thermister R10 was removed.

For example, FIG. 10 shows the results of an experiment in which variation in illuminance of a red LED light was measured, while the ambient temperature was varied. While illuminance at 23° C. was used as a reference, a rate of variation in illuminance was obtained. In the results shown in FIG. 10, illuminance varies from about 150% to about 65% within a temperature range of −40° C. to 60° C. In the results shown in FIG. 11, illuminance varies from about 80% to about 102% within the same temperature range, which indicates reduced variation. The same analysis result can be applied to FIGS. 12 to 15.

As described above, the power supply circuit according to the present embodiment enables an LED light to operate properly during winter and summer.

Next, the start assist circuit-which is the second feature of the present invention-will be described in detail.

As shown in FIG. 3, the start assist circuit 202 formed of the capacitor C7 and the resistor R5 is disposed between points 204 and 206 in the voltage regulating circuit section 200. The start assist circuit 202 shortens the delay time between a point in time when the power supply circuit 1 receives AC power and a point in time when the light source section 400 starts to emit light.

First, an operation in the case where the start assist circuit 202 is not provided will be described. The integrated circuit IC1 starts its function or operation when the DC voltage applied to the power supply connection terminal (8) reaches 12 v.

After the AC power is turned on, the voltage applied to the power supply connection terminal of the integrated circuit IC1 varies with time as follows.

From point 204 at which substantially constant DC voltage is present, current flows to the capacitor C6 via the resistor R4 in order to charge the capacitor C6. As a result, the DC voltage of the capacitor C6 increases from zero with a delay corresponding to a time constant, which is the product of the resistance of the resistor R4 and the capacitance of the capacitor C6.

Therefore, there is a time delay until the DC voltage reaches a level at which the integrated circuit IC1 starts its operation. As a result, a time delay is produced before the light source LEDs 402 start emitting light.

Figure 6:
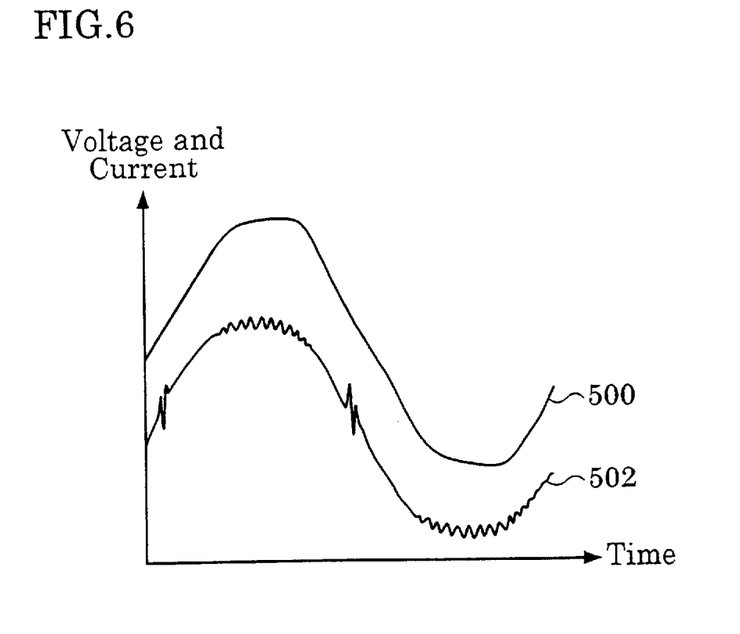
FIG. 6 is a graph showing voltage and current waveforms measured at a first measurement point in a case where a start assist circuit is not provided.

FIG. 6 shows AC voltage 500 and AC current 502 measured at point 102 (first measurement point, see FIG. 2) in the case where the start assist circuit 202 is not provided.

Figure 8:
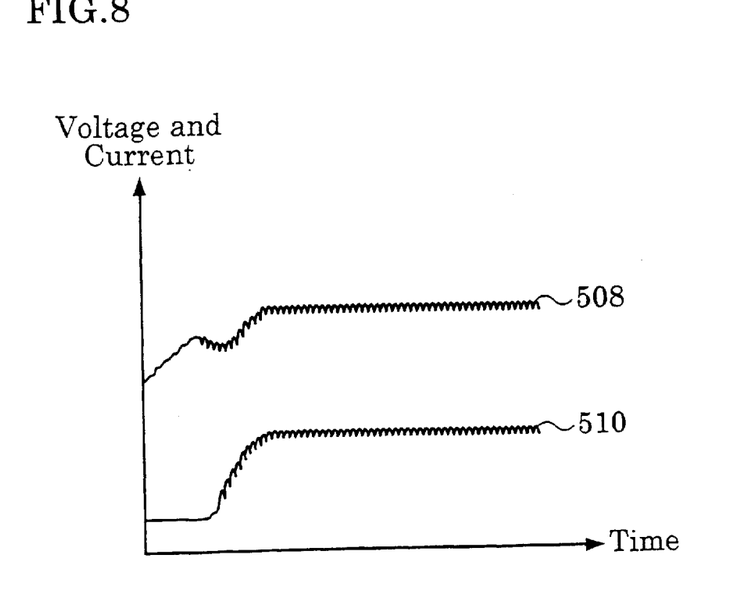
FIG. 8 is a graph showing voltage waveforms measured at second and third measurement points, respectively, in a case where the start assist circuit is not provided.

FIG. 8 shows voltage 508 measured at point 206 (second measurement point) and voltage 510 measured at point 404 (third measurement point) in the case where the start assist circuit 202 is not provided.

Next, an operation in the case where the start assist circuit 202 is provided will be described. When the start assist circuit 202 is provided, immediately after the AC power is turned on, charging of the capacitor C6 is started via two paths; i.e., a path formed by the resistor R4, and a path formed by the start assist circuit 202. Therefore, a larger charging current flows as compared with the case in which the start assist circuit 202 is not provided and only the resistor R4 supplies the charge current.

In this manner, the start assist circuit 202 increases the speed of charging of the capacitor C6, so that the voltage supplied to the power supply connection terminal (8) of the integrated circuit IC1 increases quickly. As a result, the integrated circuit IC1 starts its operation earlier, so that the delay time before the light source LEDs 402 start emitting light can be shortened.

The above-described assistance effect is achieved by means of charge current provided through differential (phase-advancing) operation of the capacitor C7, and after completion of charging of the capacitor C7, the IC power current is supplied through the resistor R4 only.

The resistor R5 limits to a proper value current which flows for assistance of quick charging, and in a steady state provides a proper impedance between points 204 and 206.

Figure 7:
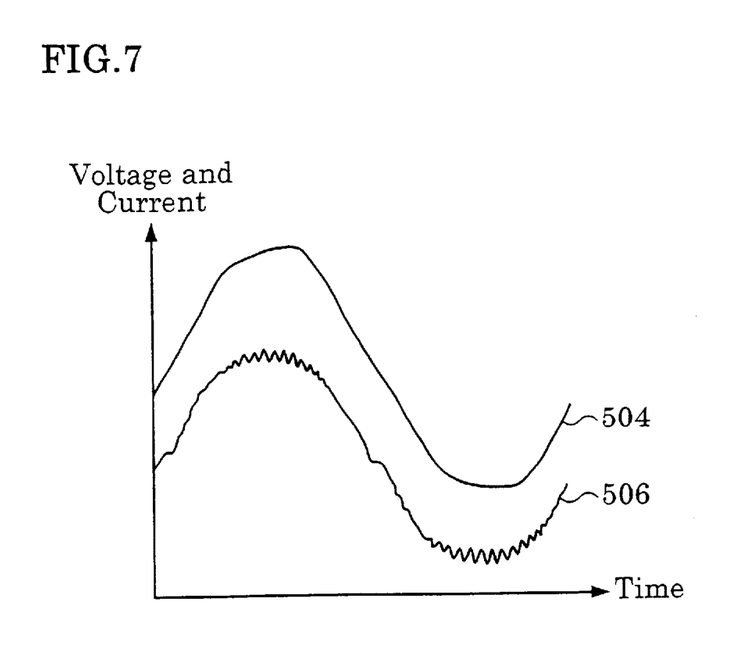
FIG. 7 is a graph showing voltage and current waveforms measured at the measurement point in a case where a start assist circuit is provided.
Figure 9:
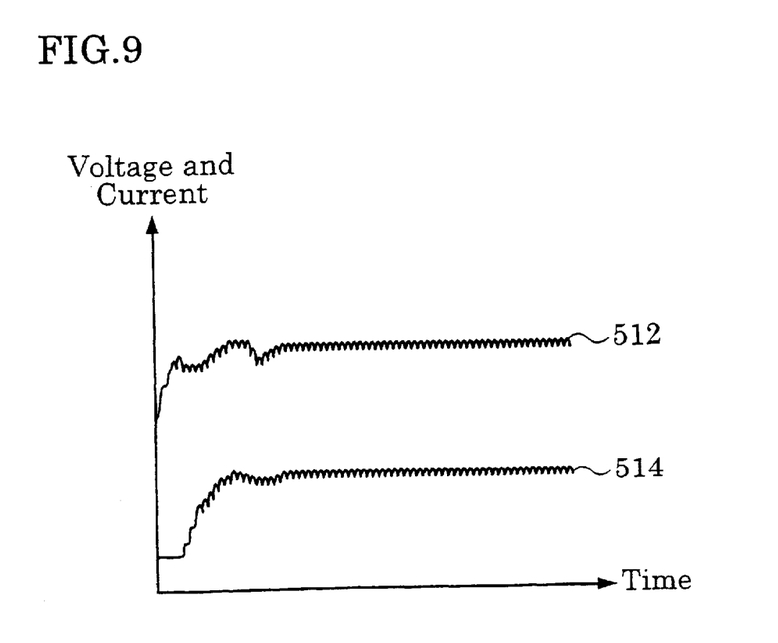
FIG. 9 is a graph showing voltage waveforms measured at the second and third measurement points, respectively, in a case where the start assist circuit is provided.

FIG. 7 shows AC voltage 504 and AC current 506 measured at point 102 (first measurement point) in the case where the start assist circuit 202 is provided; and FIG. 9 shows voltage 512 measured at point 206 (second measurement point) and voltage 514 measured at point 404 (third measurement point) in the case where the start assist circuit 202 is provided.

Through comparison between FIGS. 6 and 7, it is understood that even when the start assist circuit 202 is provided, the current and voltage measured at point 102 each assume a substantially sinusoidal waveform.

Further, through comparison between FIGS. 8 and 9, it is understood that provision of the start assist circuit 202 increases the rising speed of the voltage 512 at point 206, as well as the rising speed of the voltage 514 at point 404.

As described above, provision of the start assist circuit 202 enables the light source LEDs 402 to emit light immediately after the AC power is turned on.

Needless to say, the power supply circuit 1 according to the present invention can be used not only for traffic lights but also for ordinary lighting.

The entire disclosure of Japanese Patent Application No. 11-326104 filed on Nov. 16, 1999 including specification, claims, drawings and summary is incorporated herein by reference in its entirety.

What is claimed is:

1. A power supply circuit for traffic signal lights utilizing LEDs, comprising:
    a rectification section configured to rectify AC voltage so as to obtain DC voltage;
    a voltage regulating circuit section configured to receive the DC voltage and to output a constant voltage;
    a light-emitting diode driven by the constant voltage output from the voltage regulating circuit section; and
    an ambient temperature detection section including a parallel circuit of a thermistor and a diode configured to detect an ambient temperature, said ambient temperature detection section configured to output a detection voltage related to the ambient temperature according to temperature characteristics of at least one of the thermistor and the diode,
    wherein the voltage regulating circuit section compares the detection voltage from the ambient temperature detection section with a reference voltage so as to obtain a control signal, and outputs the constant voltage in accordance with the control signal to the light-emitting diode.

2. A power supply circuit for traffic signal lights utilizing LEDs, comprising:
    a rectification section configured to rectify AC voltage so as to obtain a DC voltage;
    a voltage regulating circuit section configured to receive the DC voltage and output a constant voltage; and
    a light-emitting diode driven by the constant voltage output from the voltage regulating circuit section, wherein
    the voltage regulating circuit section includes an integrated circuit, and a start assist circuit which shortens a rise time of the constant voltage output by increasing speed for supplying voltage to the integrated circuit.

3. A power supply circuit for traffic signal lights utilizing LEDs according to claim 2, wherein the start assist circuit includes a capacitor and a resister connected in series.

4. A power supply circuit for traffic signal lights utilizing LEDs comprising:
    a rectification section configured to rectify AC voltage so as to obtain DC voltage;
    a voltage regulating circuit section configured to receive the DC voltage and to output a constant voltage;
    a light-emitting diode driven by the constant voltage output from the voltage regulating circuit section; and
    an ambient temperature detection section including a parallel circuit of a thermistor and a diode configured to detect an ambient temperature and to output a detection voltage related to the ambient temperature according to temperature characteristics of at least one of the thermistor and the diode, wherein the voltage regulating circuit section compares the detection voltage from the ambient temperature detection section with a reference voltage so as to obtain a control signal, and outputs the constant voltage in accordance with the control signal to the light-emitting diode, the voltage regulating circuit section including an integrated circuit, and a start assist circuit which shortens a rise time of the constant voltage output by increasing speed for supplying voltage to the integrated circuit.

* * * * *